United States Patent
Dodge et al.

(10) Patent No.: US 8,566,503 B2
(45) Date of Patent: Oct. 22, 2013

(54) MULTIMEDIA FILESYSTEM HAVING UNIFIED REPRESENTATION OF CONTENT ON DIVERSE MULTIMEDIA DEVICES

(75) Inventors: Dan Dodge, Nepean (CA); Peter van der Veen, Ottawa (CA)

(73) Assignee: QNX Software Systems Limited, Kanata, Ontario (CA)

( * ) Notice: Subject to any disclaimer, the term of this patent is extended or adjusted under 35 U.S.C. 154(b) by 967 days.

(21) Appl. No.: 11/717,601

(22) Filed: Mar. 13, 2007

(65) Prior Publication Data

US 2008/0052323 A1    Feb. 28, 2008

Related U.S. Application Data

(60) Provisional application No. 60/841,804, filed on Sep. 1, 2006, provisional application No. 60/840,246, filed on Aug. 25, 2006.

(51) Int. Cl.
    *G06F 12/00*      (2006.01)

(52) U.S. Cl.
    USPC ............................. 711/103; 709/246; 711/115

(58) Field of Classification Search
    USPC ........................................................ 709/246
    See application file for complete search history.

(56) References Cited

U.S. PATENT DOCUMENTS

| | | | |
|---|---|---|---|
| 4,882,703 A | 11/1989 | Nicolai | |
| 4,926,317 A | 5/1990 | Wallach et al. | |
| 4,945,475 A | 7/1990 | Bruffey et al. | |
| 5,187,786 A | 2/1993 | Densmore et al. | |
| 5,201,044 A | 4/1993 | Frey, Jr. et al. | |
| 5,222,217 A | 6/1993 | Blount et al. | |
| 5,369,757 A | 11/1994 | Spiro et al. | |
| 5,455,944 A | 10/1995 | Haderle et al. | |
| 5,530,849 A | 6/1996 | Hanushevsky et al. | |
| 5,535,411 A | 7/1996 | Speed et al. | 395/800 |
| 5,668,958 A * | 9/1997 | Bendert et al. | 710/305 |
| 5,726,989 A | 3/1998 | Dokic | |
| 5,765,172 A | 6/1998 | Fox | |
| 5,774,715 A | 6/1998 | Madany et al. | |

(Continued)

FOREIGN PATENT DOCUMENTS

| | | |
|---|---|---|
| CA | 2 419 883 A1 | 8/2004 |
| CN | 1289966 A | 4/2001 |

(Continued)

OTHER PUBLICATIONS

First Office Action from corresponding Chinese Application No. 2007101419120, dated Apr. 10, 2009, 12 pages.

(Continued)

*Primary Examiner* — Hamza Algibhah
(74) *Attorney, Agent, or Firm* — Brinks Hofer Gilson & Lione

(57) ABSTRACT

A multimedia system comprising at least two multimedia devices having differing filesystems and/or no filesystem(s), one or more applications, and a media filesystem adapted to communicate with the at least two multimedia devices and the one or more applications is disclosed. The one or more applications are adapted to issue filesystem commands and/or receive filesystem responses in a common filesystem representation with respect to files of the at least two multimedia devices. The media filesystem may accept the filesystem commands from the one or more applications and may provide responses to filesystem commands to the one or more applications using the common filesystem representation.

37 Claims, 8 Drawing Sheets

(56) References Cited

U.S. PATENT DOCUMENTS

| | | | |
|---|---|---|---|
| 5,806,085 A | 9/1998 | Berliner | |
| 5,897,661 A | 4/1999 | Baranovsky et al. | |
| 5,995,980 A | 11/1999 | Olson et al. | |
| 6,058,400 A | 5/2000 | Slaughter | |
| 6,097,380 A | 8/2000 | Crites et al. | 345/302 |
| 6,160,796 A | 12/2000 | Zou | 370/257 |
| 6,173,291 B1 | 1/2001 | Jenevein | 707/200 |
| 6,286,013 B1 | 9/2001 | Reynolds et al. | |
| 6,292,808 B1 | 9/2001 | Obermarck et al. | |
| 6,324,637 B1 | 11/2001 | Hamilton | |
| 6,356,863 B1 | 3/2002 | Sayle | |
| 6,377,992 B1* | 4/2002 | Plaza Fernandez et al. | 709/227 |
| 6,389,427 B1 | 5/2002 | Faulkner | |
| 6,389,513 B1 | 5/2002 | Closson | |
| 6,396,421 B1 | 5/2002 | Bland | |
| 6,412,042 B1 | 6/2002 | Paterson et al. | |
| 6,438,661 B1 | 8/2002 | Beardsley et al. | 711/144 |
| 6,467,021 B1* | 10/2002 | Sinclair | 711/113 |
| 6,496,944 B1 | 12/2002 | Hsiao et al. | 714/15 |
| 6,509,850 B1 | 1/2003 | Bland | |
| 6,571,259 B1 | 5/2003 | Zheng et al. | |
| 6,584,582 B1 | 6/2003 | O'Connor | |
| 6,591,376 B1 | 7/2003 | VanRooven et al. | |
| 6,606,628 B1 | 8/2003 | Monsen et al. | |
| 6,661,357 B2 | 12/2003 | Bland | |
| 6,675,177 B1 | 1/2004 | Webb | |
| 6,732,124 B1 | 5/2004 | Koseki et al. | |
| 6,748,491 B2 | 6/2004 | Rodriguez | |
| 6,754,696 B1* | 6/2004 | Kamath et al. | 709/213 |
| 6,845,401 B1 | 1/2005 | Papadopoulos et al. | |
| 6,856,993 B1 | 2/2005 | Verma et al. | |
| 6,922,708 B1 | 7/2005 | Sedlar | |
| 6,983,462 B2 | 1/2006 | Savov et al. | 718/104 |
| 7,003,619 B1 | 2/2006 | Moore et al. | |
| 7,047,257 B2 | 5/2006 | Fletcher et al. | |
| 7,076,599 B2 | 7/2006 | Aasheim et al. | 711/103 |
| 7,096,248 B2* | 8/2006 | Masters et al. | 709/201 |
| 7,359,934 B1 | 4/2008 | Ricart et al. | 709/203 |
| 7,529,784 B2* | 5/2009 | Kavuri et al. | 707/204 |
| 7,555,483 B2* | 6/2009 | Maeda et al. | 707/1 |
| 7,565,452 B2* | 7/2009 | Freiburg et al. | 709/246 |
| 7,676,691 B2 | 3/2010 | Fachan et al. | 715/15 |
| 7,743,111 B2* | 6/2010 | Soltis | 709/217 |
| 7,599,972 C1 | 6/2012 | Dodge et al. | 707/205 |
| 2001/0044798 A1 | 11/2001 | Nagral et al. | |
| 2002/0019936 A1* | 2/2002 | Hitz et al. | 713/165 |
| 2002/0048223 A1 | 4/2002 | Ota et al. | |
| 2002/0120634 A1* | 8/2002 | Min et al. | 707/200 |
| 2002/0143862 A1 | 10/2002 | Peterson | |
| 2002/0156840 A1 | 10/2002 | Ulrich et al. | |
| 2002/0156891 A1 | 10/2002 | Ulrich et al. | 709/225 |
| 2002/0156937 A1 | 10/2002 | Wong et al. | |
| 2002/0156938 A1 | 10/2002 | Wong et al. | |
| 2002/0156975 A1 | 10/2002 | Staub et al. | 711/114 |
| 2002/0165942 A1 | 11/2002 | Ulrich et al. | |
| 2002/0174295 A1 | 11/2002 | Ulrich et al. | |
| 2002/0178271 A1* | 11/2002 | Graham et al. | 709/229 |
| 2002/0194309 A1* | 12/2002 | Carter et al. | 709/219 |
| 2003/0021346 A1 | 1/2003 | Bixby et al. | 375/240.1 |
| 2003/0061316 A1 | 3/2003 | Blair et al. | 709/220 |
| 2003/0065682 A1* | 4/2003 | Nakajima | 707/200 |
| 2003/0070001 A1* | 4/2003 | Belknap et al. | 709/321 |
| 2003/0074457 A1 | 4/2003 | Kluth | 709/229 |
| 2003/0110237 A1 | 6/2003 | Kitamura et al. | 709/219 |
| 2003/0115227 A1 | 6/2003 | Guthery | |
| 2003/0140210 A1 | 7/2003 | Testardi | |
| 2003/0163594 A1 | 8/2003 | Aasheim et al. | |
| 2004/0064500 A1* | 4/2004 | Kolar et al. | 709/202 |
| 2004/0114589 A1 | 6/2004 | Alfieri et al. | |
| 2004/0215600 A1 | 10/2004 | Aridor et al. | |
| 2004/0236793 A1 | 11/2004 | Kanai et al. | |
| 2004/0255048 A1 | 12/2004 | Lev Ran et al. | 709/249 |
| 2005/0060420 A1* | 3/2005 | Kovacevic | 709/231 |
| 2005/0091229 A1 | 4/2005 | Bali et al. | |
| 2005/0091287 A1 | 4/2005 | Sedlar | |
| 2005/0097225 A1 | 5/2005 | Glatt et al. | 709/248 |
| 2005/0117885 A1* | 6/2005 | Lee et al. | 386/95 |
| 2005/0135341 A1 | 6/2005 | Kim | 370/352 |
| 2005/0138085 A1 | 6/2005 | Verma et al. | 707/202 |
| 2005/0147130 A1 | 7/2005 | Hurwitz et al. | 370/503 |
| 2005/0149525 A1* | 7/2005 | Verma et al. | 707/8 |
| 2005/0154747 A1 | 7/2005 | Kii et al. | 707/101 |
| 2005/0182799 A1* | 8/2005 | Hitz et al. | 707/202 |
| 2005/0210507 A1 | 9/2005 | Hawkins et al. | |
| 2005/0240588 A1* | 10/2005 | Siegel et al. | 707/9 |
| 2005/0246362 A1 | 11/2005 | Borland | |
| 2005/0251540 A1* | 11/2005 | Sim-Tang | 707/202 |
| 2005/0256845 A1 | 11/2005 | Jen et al. | |
| 2005/0273486 A1* | 12/2005 | Keith | 709/200 |
| 2006/0005124 A1* | 1/2006 | Speicher | 715/514 |
| 2006/0015431 A1 | 1/2006 | Bugaj et al. | |
| 2006/0021057 A1* | 1/2006 | Risan et al. | 726/26 |
| 2006/0041600 A1* | 2/2006 | Lehtola et al. | 707/201 |
| 2006/0052091 A1 | 3/2006 | Onyon et al. | |
| 2006/0069891 A1* | 3/2006 | Nishikawa et al. | 711/162 |
| 2006/0074851 A1 | 4/2006 | Nagai et al. | |
| 2006/0117056 A1 | 6/2006 | Havewala et al. | |
| 2006/0136529 A1 | 6/2006 | Pudipeddi et al. | |
| 2006/0188215 A1 | 8/2006 | Matsutani | 386/46 |
| 2006/0190469 A1 | 8/2006 | Kathuria et al. | |
| 2006/0195480 A1 | 8/2006 | Spiegelman et al. | |
| 2006/0206538 A1 | 9/2006 | Veazey | |
| 2006/0218195 A1 | 9/2006 | LaChapelle et al. | 707/104.1 |
| 2006/0224620 A1 | 10/2006 | Silverman et al. | 707/104.1 |
| 2006/0282471 A1 | 12/2006 | Mark et al. | |
| 2006/0287990 A1* | 12/2006 | Yoon | 707/3 |
| 2007/0022122 A1* | 1/2007 | Bahar et al. | 707/10 |
| 2007/0083540 A1 | 4/2007 | Gundla et al. | 707/101 |
| 2007/0103984 A1* | 5/2007 | Kavuri et al. | 365/185.17 |
| 2007/0233936 A1* | 10/2007 | Chu | 711/103 |
| 2008/0005114 A1 | 1/2008 | Li | 707/9 |
| 2008/0005120 A1 | 1/2008 | Li | 707/10 |
| 2008/0027998 A1* | 1/2008 | Hara | 707/200 |
| 2008/0046667 A1 | 2/2008 | Fachan et al. | 711/154 |
| 2009/0106196 A1 | 4/2009 | Gutlapalli et al. | 707/3 |
| 2009/0265793 A1* | 10/2009 | Risan et al. | 726/29 |

FOREIGN PATENT DOCUMENTS

| | | |
|---|---|---|
| CN | 1567256 A | 1/2005 |
| CN | 1705935 A | 12/2005 |
| EP | 0 410 210 A2 | 1/1991 |
| EP | 0 454 340 A2 | 10/1991 |
| EP | 0 588 488 A1 | 3/1994 |
| EP | 1 089 176 A2 | 4/2001 |
| EP | 1 522 927 A2 | 4/2005 |
| EP | 1 895 434 A1 | 3/2008 |
| JP | 62 186 361 A | 8/1987 |
| JP | 06 139 124 A | 5/1994 |
| JP | 07-078498 | 3/1995 |
| JP | 2001-175624 | 6/2001 |
| JP | 2001-175681 | 6/2001 |
| JP | 2002-334006 | 11/2002 |
| JP | 2003-173279 | 6/2003 |
| JP | 2003-216620 | 7/2003 |
| JP | 2005-182778 | 7/2005 |
| JP | 2006-235717 | 9/2006 |
| KR | 10-2004-0058213 | 7/2004 |
| KR | 10-2005-0041970 | 5/2005 |
| KR | 2006-0009717 | 2/2006 |
| KR | 10/2006/0023387 | 3/2006 |
| WO | WO 00/14632 A1 | 3/2000 |
| WO | WO 02/17140 A2 | 2/2002 |
| WO | WO 03/036541 A1 | 5/2003 |
| WO | WO 2006/061454 A1 | 6/2006 |
| WO | WO 2006-061454 A1 | 6/2006 |
| WO | WO 2006/074110 A2 | 7/2006 |

OTHER PUBLICATIONS

Cardenas, Alfonso F., "Analysis and Performance of Inverted Data Base Structures," IBM Research Laboratory, San Jose, Communication of ACM May 1975, vol. 18, No. 5, pp. 253-263.

(56) References Cited

OTHER PUBLICATIONS

Colyer, A. M., "Displaying and Manipulating Relationships," IBM Technical Disclosure Bulletin, Dec. 1995, vol. 38, Issue No. 12, pp. 391-396.
QNX Software Systems, "Embedded transaction filesystem (ETFS)," *System Architecture*, 2004, pp. 193-198.
Woodhouse, David, JFFS: The Journaling Flash File System, 2005, pp. 1-12, Red Hat, Inc.
Yim, Keun Soo, A Flash Compression Layer for SmartMedia Card Systems, 2004, pp. 192-197, vol. 50, No. 1, IEEE Transactions on Consumer Electronics.
Sivathanu, Gopalan, Wright, Charles P., Zadok, Erez, Enhancing File System Integrity Through Checksums, dated Apr. 3, 2009, pp. 1-10, available at www.filesystems.org.
Muniswamy-Reddy, Kiran-Kumar, A Versatile and User-Oriented Versioning File System, Dec. 2003, pp. 1-40, Stony Brook University.
U.S. Appl. No. 12/955,524, filed Nov. 30, 2010, Dodge.
U.S. Appl. No. 12/957,999, filed Dec. 1, 2010, Dodge.
U.S. Appl. No. 12/960,197, filed Dec. 3, 2010, Dodge et al.
Tambat, Siddhartha V. et al., Sub-tagged Caches: Study of Variable Cache-Block Size Emulation, Jul. 31, 2001, pp. 1-16, Computer Science and Automation Department Indian Institute of Science, India.
Metafile—a whatis.com definition, dated Oct. 14, 2004, pp. 1-2, Whatis.com Target Search from whatis.techtarget.com/definition, downloaded from http://web.archive.org.
U.S. Appl. No. 13/158,108, filed Jun. 10, 2011, Dodge et al.
U.S. Appl. No. 13/221,502, filed Aug. 30, 2011, Dodge.
U.S. Appl. No. 90/011,299, filed Dec. 22, 2010, Dodge et al.
Shuff, Pat et al., Hash Addressing Viability for Use in Distributed File Systems, 2004, pp. 1-7, Proceedings of the Winter Int'l Symposium on Information and Communication Technologies.
Pearson, Peter K., Fast Hashing of Variable-Length Text Strings, Jun. 1990, pp. 677-680, vol. 33, No. 6, Communications of the ACM.
European Search Report, dated Jul. 1, 2008, pp. 1-7, European Patent Application No. 07023774.8, European Patent Office, Germany.
Korean Office Action, dated Sep. 17, 2009, pp. 1-4, Korean Patent Application No. 10-2007-0130349, Korean Patent Office, Korea.
Korean Office Action, dated Dec. 1, 2009, pp. 1-2, Korean Patent Application No. 10-2007-0130349, Korean Patent Office, Korea.
Canadian Office Action, dated Jun. 19, 2012, pp. 1-3, Canadian Patent Application No. 2,598,349, Canadian Patent Office, Canada.
Final Office Action, dated Jul. 17, 2012, pp. 1-25, U.S. Appl. No. 11/173,945, U.S. Patent and Trademark Office, Virginia.
Office Action, dated Jul. 18, 2012, pp. 1-15, U.S. Appl. No. 13/221,502, U.S. Patent and Trademark Office, Virginia.
Canadian Office Action, dated Jul. 19, 2012, pp. 1-3, Canadian Patent Application No. 2,550,871, Canadian Patent Office, Canada.
Japanese Office Action, dated Aug. 29, 2012, pp. 1-8, Japanese Patent Application No. 2007-317757, Japanese Patent Office, Japan.
Non-Final Office Action, dated Feb. 5, 2013, pp. 1-28, U.S. Appl. No. 11/173,945, U.S. Patent and Trademark Office, Virginia.
Non-Final Office Action, dated Feb. 7, 2013, pp. 1-21, U.S. Appl. No. 11/765,258, U.S. Patent and Trademark Office, Virginia.
Final Office Action, dated Feb. 11, 2013, pp. 1-19, U.S. Appl. No. 13/221,502, U.S. Patent and Trademark Office, Virginia.
Canadian Office Action, dated Apr. 18, 2012, pp. 1-3, Canadian Patent Application No. 2,598,312, Canadian Patent Office, Canada.
Indian Office Action, dated Feb. 22, 2012, pp. 1-2, Indian Patent Application No. 2959/CHE/2007, Indian Patent Office, India.
U.S. Final Office Action, issued in U.S. Appl. No. 11/950,227, dated Jun. 4, 2013, pp. 1-17, U.S. Patent and Trademark Office, Alexandria, Virginia.
U.S. Final Office Action, issued in U.S. Appl. No. 11/173,945, dated Jul. 22, 2013, pp. 1-27, U.S. Patent and Trademark Office, Alexandria, Virginia.

\* cited by examiner

| FIELD NAME | FIELD CONTENTS |
|---|---|
| @field fid | The FID for the media track |
| @field msid | The mediastore that this track is stored on |
| @field pathid | The path in the mediastore where the file is found |
| @field filename | The filename of the media track |
| @field ftype | The type of the media track (audio, photo, video, etc ) |
| @field copied_fid | The FID of the source file, if this track was copied by the MME |
| @field valid | Indicates whether this track is valid |
| @field accurate | Indicates whether the metadata for the track is correct |
| @field copyright | The copyright year of the track |
| @field seen | Indicates that the track has been identified on the mediastore |
| @field artist_id | The ID of the track artist |
| @field title | The track title |
| @field album_id | The ID of the track album |
| @field genre_id | The ID of the track genre |
| @field year | The year of the track |
| @field size | The size of the track |
| @field artwork_id | The ID of the track artwork |
| @field category_id | The ID of the track category |
| @field composer_id | The ID of the track composer |
| @field description | An arbitrary text description of the track |
| @field time | The track length |
| @field date_added | The date the track was added to the library table |
| @field date_modified | The date the track entry was modified in the library table |
| @field last_played | The date this track was last played by the MME |
| @field play_count | The number of times this track has been played by the MME |
| @field rating | The user rating for the track |
| @field equalizer_id | The ID for an equalizer setting for this track |
| @field bitrate | The track bitrate |

Figure 6

| FIELD NAME | FIELD CONTENTS |
|---|---|
| @field plid | The playlist ID |
| @field ownership | Indicates who owns this playlist (MME, device, etc.) |
| @field available | Indicates whether this playlist is available (Are the devices having the media files attached to system?) |
| @field msid | A link to a media store |
| @field mode | The playlist mode: library or browse |
| @field date_modif | The date this playlist was last modified |
| @field size | The number of tracks in the playlist |
| @field filename | If the playlist points to the the filename of playlist on a device |
| @field name | The playlist name |
| @field statement | An SQL statement that returns a list of FIDs, either from the library table, or the playlistdata table. |

Figure 7

| FIELD NAME | FIELD CONTENTS |
|---|---|
| msid | The media store identifier used to link to other tables. |
| slotid | The slot in which the media store is inserted. |
| available | Set to a predetermined value if the media store is available. All music in the library table is available if it's media store is available. |
| storage_type | The type of media store. |
| name | The textual name that is to be displayed to the user for the media store. |
| identifier | The unique identifier for the media store device. For AudioCDs, this is their discid, for USB Mass storage sticks, this is the serial number, etc. |
| lastplayedfid | The last fid played from the media store. |
| lastplayedpos | The last played position of the last played fid. |
| mountpath | The mount path of the media store. |

Figure 8

| FIELD NAME | FIELD CONTENTS |
|---|---|
| slotid | The slot identifier which links to other rows in the mediastores table |
| active | If 0 then the slot currently has no mediastore activated. If 1 then it is has a mediastore activated in it. |
| msid | If > 0 then it is the mediastore id of the mediastore inserted |
| slottype | The type of slot. |
| concurrency | The maximum number of readers on the slot type. |
| path | The full filesystem pathname to monitor for insertions. |

Figure 9

MULTIMEDIA FILESYSTEM HAVING UNIFIED REPRESENTATION OF CONTENT ON DIVERSE MULTIMEDIA DEVICES

PRIORITY CLAIM

This application claims the benefit of priority from U.S. Ser. No. 60/841,804, filed Sep. 1, 2006, and from U.S. Ser. No. 60/840,246, filed Aug. 25, 2006, both of which are incorporated by reference.

BACKGROUND OF THE INVENTION

1. Technical Field

The present invention relates to a filesystem for use in a computer, embedded controller, or the like. More particularly, this invention is directed to a filesystem that represents content from various, disparate multimedia devices in a unified filesystem representation for access by one or more higher-level applications.

2. Related Art

Multimedia systems may employ multiple media players for playback of multimedia content. Such players include cell phones with Secure Digital (SD) Cards that play encoded music files, Sony® PlayStationPortable® units that use Sony® Memory Stick technology for storage and playback of encoded music files, iPod® devices that employ internal hard disk drives for storage and playback of media files, including video media files, and other media players, including those that employ Universal Serial Bus (USB) flash memory. Media files may be encoded on these devices using a variety of different formats such as MPEG layer III (MP3) encoding, Windows Media Audio (WMA) encoding, Windows Media Video encoding, RealAudio encoding, RealVideo encoding, DVD video, CD audio, and the like files.

Such devices do not include filesystems that are organized in a readily accessible manner. Rather, these systems may use proprietary formats, often with digital rights management (DRM) protection, which makes it very difficult to access and manage their data content with a generic personal computer or embedded processor. As a result, many software and hardware systems that interact with these devices and systems must be custom designed to accommodate their proprietary device formats. These multimedia systems and devices therefore are not readily adaptable to today's interconnected world in which a vast interactive network of personal computing devices reside in almost every home and office, as well as a quickly growing proportion of automobiles, wireless personal digital assistants and telephones.

SUMMARY

A multimedia system that comprises a plurality of multimedia devices having differing filesystems and/or no filesystem(s), one or more applications, and a media filesystem adapted to communicate with the plurality of multimedia devices and the one or more applications areis disclosed. The one or more applications may be adapted to issue filesystem commands and/or receive filesystem responses in a common filesystem representation with respect to files of the plurality of multimedia devices. The media filesystem may accept the filesystem commands from the one or more applications and may provide responses to filesystem commands to the one or more applications using the common filesystem representation.

In one construction of the system, the common filesystem is in the form of a POSIX, UNIX, or the like, interface. Still further, the one or more applications may include a human machine interface (HMI) module and/or a multimedia engine (MME) module.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 6 is a table illustrating exemplary fields that may be employed in media file records of the database shown in FIG. 1.

FIG. 7 is a table illustrating exemplary fields that may be employed in playlist file records of the database shown in FIG. 1.

FIG. 8 is a table illustrating exemplary fields that may be employed in a media stores table of the database shown in FIG. 1.

FIG. 9 is a table illustrating exemplary fields that may be employed in a slots table of the database shown in FIG. 1.

DETAILED DESCRIPTION OF THE PREFERRED EMBODIMENTS

Figure 1:
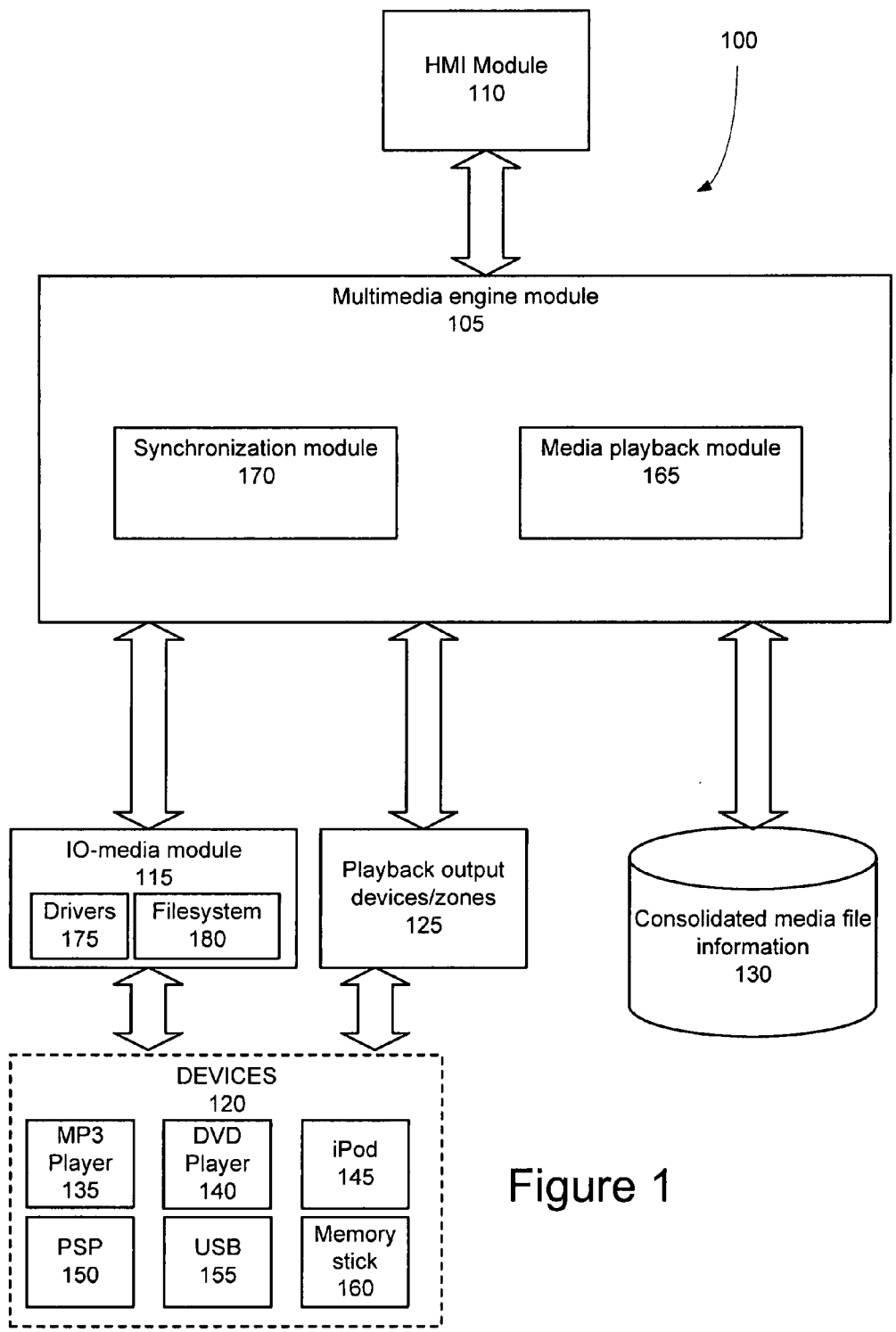
FIG. 1 is a block diagram of an exemplary multimedia system 100 that may include a unified filesystem representation of media files on a plurality of media devices.

FIG. 1 is a block diagram of an exemplary multimedia system 100 that may include a unified filesystem representation of media files on a plurality of media devices. As shown, the exemplary system 100 may include a Multimedia Engine (MME) module 105 that interacts with a human machine interface (HMI) module 110, as well as interacting with an IO media module 115, that provides an interface between a plurality of different multimedia devices 120 and the MME module 105. The HMI module 110 provides an interface that may include multimodal user inputs such as voice, touch buttons and touch screens that are employed by the user to identify the content to be played and to request certain playback operations. The information acquired by the HMI module 110 as a result of these user interactions is passed to the MME module 105. The MME module 105 obtains media file information for a requested file name, file type, genre, artist, etc., using metadata from consolidated media file information stored, for example, in a database 130. Database 130 is used by the MME module 105 to store and retrieve metadata for media files that client applications, such as the HMI module 110, access. The client applications may use this information to display media files to a user or otherwise arrange for playback of the media files in a desired manner on one or more playback output devices/zones 125. Database 130 may support multiple connections from multiple clients in a concurrent manner. The information in database 130 may be divided between multiple files. Each database file can be stored in RAM, flash, or hard drives in a configurable manner that does not affect access by higher level applications.

The HMI module 110 may be used to implement a variety of different functions, including the following:

1. Sending requests to the MME 105 for playback and copying of media files on the devices 120. It may be allocated to the HMI module 110, as manipulated by a user, to decide which media is to be played and in what order. The resulting request is then sent to the MME 105 for processing. Playback of the selected media to one or more of the playback output devices/zones 125 may be placed under the control of the media playback module 165 of the MME module 105.
2. Browsing the media file contents of devices 120. The MME module 105 may access database 130 to expose some or all of the available media to the HMI module 110. User commands may be input to the HMI module 110 to direct the MME module to return information relating to selected media to the HMI module 110.
3. Supporting the MME module 105 browsing interface. Some devices require that the client application browse them directly. For example, when a DVD Video is played, its on-screen navigation menu appears. The HMI module 110 may be used to send navigation commands (such as up, down, left, right, play, etc.) to the device through the MME module 105 to navigate the DVD menu.
4. Accepting notifications from the MME module 105 and responding accordingly. The MME module 105 provides event notifications to a client application. Some examples of events that generate notifications are "song changed," "new device inserted," and so on. The HMI module 110 may remain synchronized with the MME module 105 and media by, for example, accepting such messages and updating itself accordingly.

The MME module 105 may be implemented as a resource manager that handles device discovery and synchronization using, for example, a synchronization module 170. The synchronization module 170 may be used to synchronize the consolidated media file information of database 130 with the media content of devices 120. The MME module 105 also may provide a high-level API for managing playback (play, stop, and seek commands) using the media playback module 165.

The MME module 105 may be responsible for a wide range of functions, including the following:

1. Playing media. Such media operations may be executed by the media playback module 165 and may include seeking, pausing, stopping, changing volume, adjusting balance and fade, and so on. The playback module 165 may abstract the type of media and how it is played from the client application level, such as HMI module 110. For example, when the HMI module 110 instructs the MME module 105 to play some media in a DVD player, the HMI module 110 does not need to know whether the media is stored on an audio CD or DVD in the drive. In most cases the playback is handled by the media playback module 165 of the MME module 105. However, for some devices like iPod® players or PlaysForSure® devices, the MME module 105 passes the playback request to the device itself.
2. Synchronizing devices 120 and the database 130. The synchronization module 170 of the MME module 105 may be used to update the database 130 with metadata corresponding to all the media files and devices that it detects. Client applications may browse the database 130 either directly or through, for example, the MME module 105 to browse music, create playlists, and so on. When a media device 120 is connected to the system 100, the MME module 105 detects its presence and begins synchronizing the information on the device with the database 130. The information in database 130 may consolidate metadata from multiple, diverse devices 120 into a single format that is independent of the types of devices attached to system 100.
3. Providing a browsing interface for devices. Because of the large list of devices that the MME module 105 may support, it may be provided with a browsing abstraction layer that is the same for all devices. This allows a client application, such as the HMI module 110, to browse all devices supported by the MME module 105 without having to support them directly.

A number of diverse multimedia devices may be attached to the system 100 shown in FIG. 1. The devices 120 may include one or more MP3 players 135, one or more DVD players 140, one or more iPod® players 145, one or more PSP devices 150, one or more USB storage devices 155, and/or one or more memory stick devices 160. At least some of the media devices 120 may include their own proprietary filesystem while others may be accessed using conventional file systems such as POSIX, UNIX, or the like. IO-media module 115 may include a plurality of device drivers 175 to facilitate hardware interaction between each high-level application and media devices 120.

High-level applications, such as the HMI module 110 and MME module 105 may require direct access to the files on devices 120. For example, MME module 105 may access the files on each device in order to synchronize the metadata in database 130. Since the filesystems of media devices 120 may differ substantially from one another, the MME module 105, as well as each high-level application attempting to access all of the devices 120, may require individual modules providing an interface between the high-level application and the individual devices. Such architectures may prove to be quite inefficient and difficult to implement, particularly when a wide range of multimedia devices are attached to system 100.

Rather than requiring implementation of specific drivers in each of the high-level modules for each of the attached media devices, system 100 employs device drivers 175 that cooperate with a unified filesystem module 180 to present a common filesystem for presentation to the high-level modules. To this end, high-level modules may access the media content of devices 120 using a single set of filesystem commands, such as those associated with POSIX, UNIX, and the like.

Figure 2:
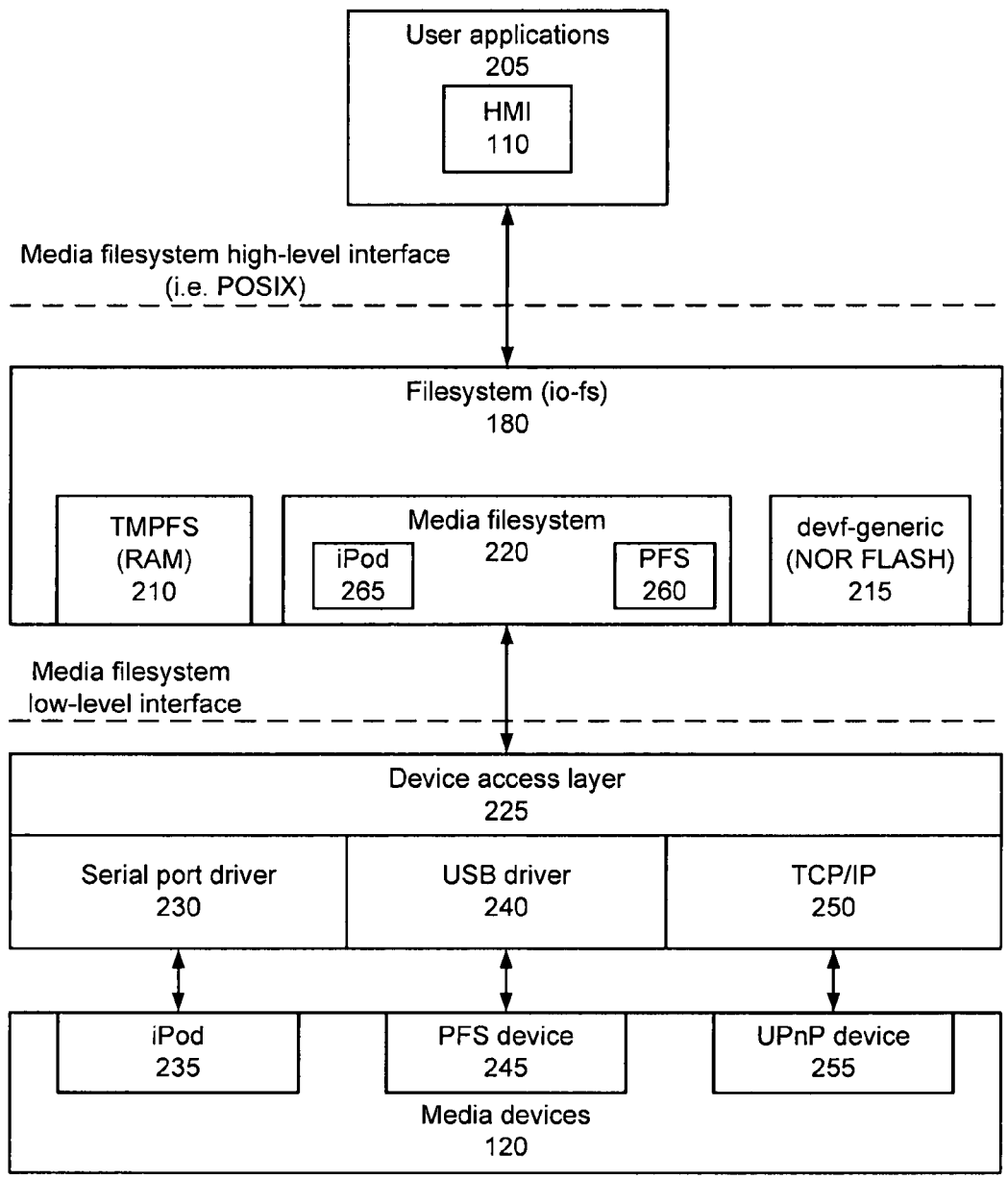
FIG. 2 illustrates one manner of implementing the filesystem shown in FIG. 1 and its relationship to other modules/components.

FIG. 2 illustrates one manner of implementing the filesystem 180 and its relationship to other modules/components. In this exemplary implementation, filesystem 180 is comprised of a high-level interface io-fs, such as a POSIX interface, that is accessible to user applications 205, such as the HMI module 110, using filesystem commands. The filesystem 180 also may include a number of low-level interface modules/components that interface with a device access layer 225. The modules/components of filesystem 180 may include a TMPFS module 210, a devf-generic module 215, and a media filesystem 220.

The media filesystem 220 may be an io-fs module that presents a POSIX-like file system view of media devices 120. The filesystem may be implemented as a QNX® Neutrino® resource manager that handles file system semantics, including path name resolution, file and directory access, symbolic links, permissions, and block caching. Media devices that the media filesystem 220 may access include portable music devices such as iPod® players and PlaysForSure® devices, as well as UPnP devices that attach to a network.

In the system shown in FIG. 2, a high-level portion of the media filesystem 220 interfaces with a device access layer 225 that may be implemented separate from the media filesystem 220 or integrated with it. The device access layer 225, in turn, interfaces with individual drivers that are tailored to access individual media device types. Here, a serial port driver 230 is used to interface with an iPod® device 235, a USB driver 240 is used to interface with a PlaysforSure® device 245, and a TCP/IP driver 250 is used to interface with a universal plug and play (UPnP) device 255. The media filesystem 220 allows access to the contents of devices 235, 245, and 255 using, for example, POSIX functions related to file and directory operations.

The MME 105 may use the media filesystem 220 to control and browse media devices 120. When a physical device is detected to be in some way attached to the media filesystem 220 (via USB, serial port, wired network or wireless network for example), a filesystem representing the device appears under the /fs directory of the filesystem. The contents of each device is made available as a filesystem with, for example, the root directory of the device mounted on /fs/dev_id, where dev_id is a name that indicates the type of device with a numeric suffix representing the instance number of the device. The first device discovered, for example, may have an instance number of 0. For example:

if the first device is an iPod® device, then the media filesystem 220 may make its contents accessible at /fs/ipod0.

if the first device is a PFS/MTP device, then the media filesystem 220 may make its contents accessible at /fs/psf0.

if the first device is a UPnP device, then the media filesystem 220 may make its contents accessible at /fs/upnp0.

The device access layer 225 will generate a device information file that can be accessed as if it were a file in a traditional filesystem. The information file is located at a root directory for each device as .FS_info./info.xml. This device information file may be in the form of an XML-formatted information file which is used by higher level applications and also may be useful for human viewing.

The following sections list some file-related POSIX functions that may be supported by the media filesystem 220 and that may be used in a user application. For example, the following directory access operations may be supported:
opendir( )
readdir( )
closedir( )

Additionally, the following file access operations also may be supported:
open( )
read( )
write( )
lseek( )
devctl( )
close( )

The media filesystem module 220 makes disparate media devices 120 appear, for example, as POSIX-compliant filesystems to the MME 105 and other high-level applications.

Further, it may provide some proprietary extensions specific to one or more of the media devices 120. The exemplary media filesystem module 220 shown in FIG. 2 includes a PFS module 260 for connecting with PlaysForSure® devices, and an iPod® module 265 for connecting with Apple® iPod® devices. PlaysForSure® is a Microsoft media standard for devices using the Media Transport Protocol (MTP). It implements Digital Rights Management (DRM).

Devices that support MTP provide a view of media content that comprises objects with properties. These objects and their properties may be accessed via a command and response protocol with an optional data transfer phase. Commands that deal with objects may be executed in the context of a session. When a session is started, each command within the session has a sequential transaction identifier. Within any particular session, each item of media content is assigned a 32 bit "object handle," which is unique for the duration of the session. Given the object handle, properties such as the object's name, format, and metadata can be obtained. Each object has a parent object, which facilitates viewing of the media in a hierarchical file structure. Certain object types may serve as folders or directories, where the objects contained in these object types may share the same parent object.

Figure 3:
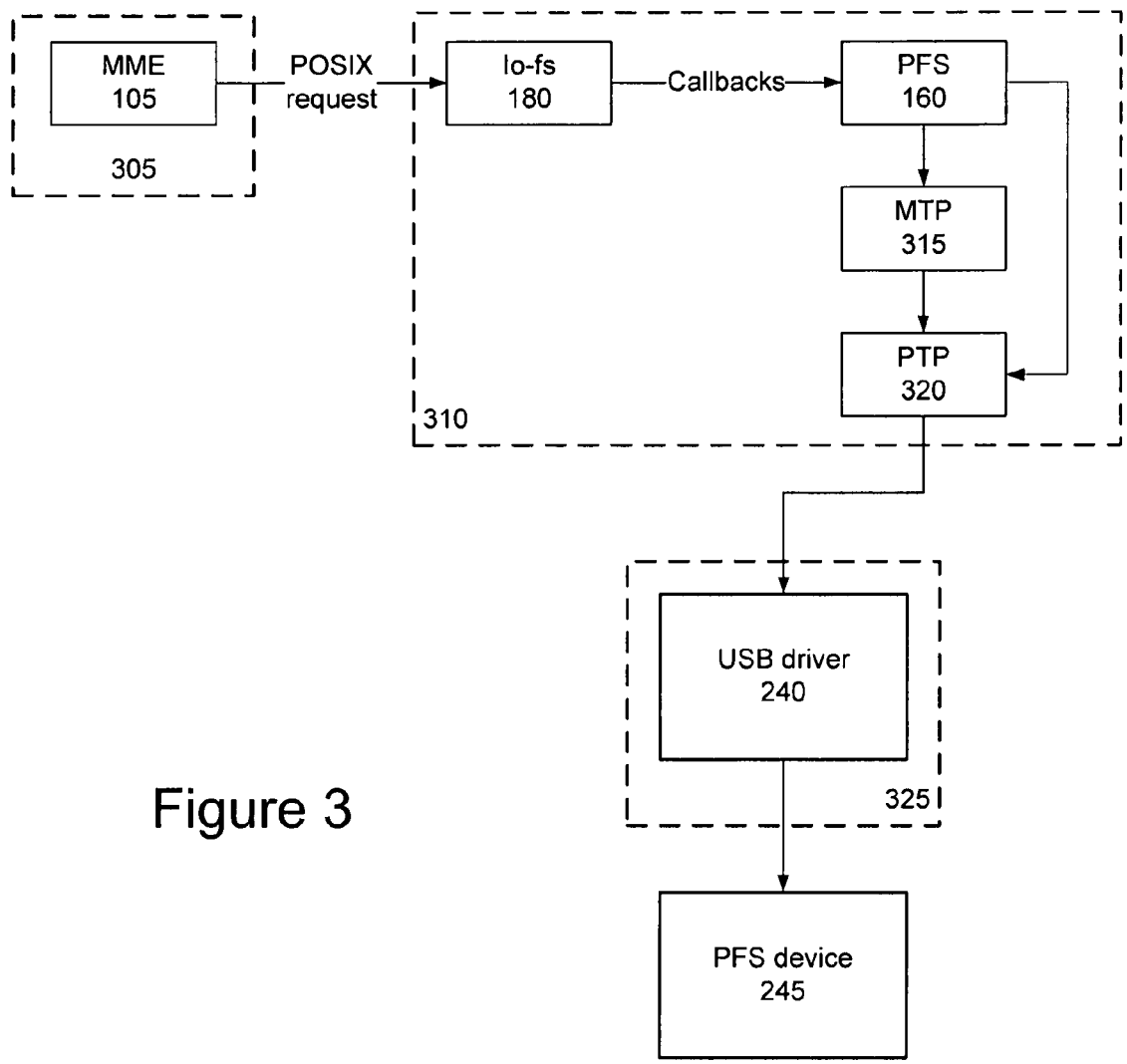
FIG. 3 illustrates one manner in which a media filesystem may access the content of a PFS device.

Separate processes 305, 310, and 325 associated with accessing PFS devices are shown in FIG. 3. The process 305 includes an instance of the MME 105, which may be used to connect to, browse, and play media from a PFS device 245 via the io-fs module 180 shown in connection with process 310. PlaysForSure® connectivity may be comprised of three layers:

1. At the top layer may be the PFS module 160, which may be responsible for presenting a filesystem view of the device to io-fs 305 for further access by the MME 105. When io-fs 180 initializes the PFS module 160, it may set up a structure filled with function pointers that it can call into. In this way, the PFS module 160 can "translate" POSIX commands into MTP requests, and vice versa.

2. An MTP layer 315 may be Microsoft-supplied software that handles MTP messages.

3. A PTP layer 320 may handle Picture Transfer Protocol (PTP) messages, an implementation of the Still Image class of USB service. Though originally a protocol developed for use with digital cameras, it has been extended and may be used as a foundation for accessing multimedia content of PFS devices. The PTP layer 320 may communicate directly with a USB driver 240 that, in turn, communicates with PFS device 245.

The PFS module 160 may be used to identify which media objects have been encrypted using Microsoft's WMDRM technology. It may use the DRM extensions to MTP to register itself with the PlaysForSure® device—this registration may re-occur periodically to maintain digital rights in the content.

The iPod® module 265 provides a filesystem view of a connected Apple® iPod® device to the MME 105 or to other high-level application. An iPod® device can connect via its 30 pin Omni connector to either a USB or RS232 serial UART connection and system 100. When the device is connected to a RS232 serial UART port, the ipod module 265 may communicate directly with a communications manager for the hardware. When the device is connected to a USB port, the ipod module 265 may communicate with a usb device communications manager, which simulates a serial connection on a USB port.

Figure 4:
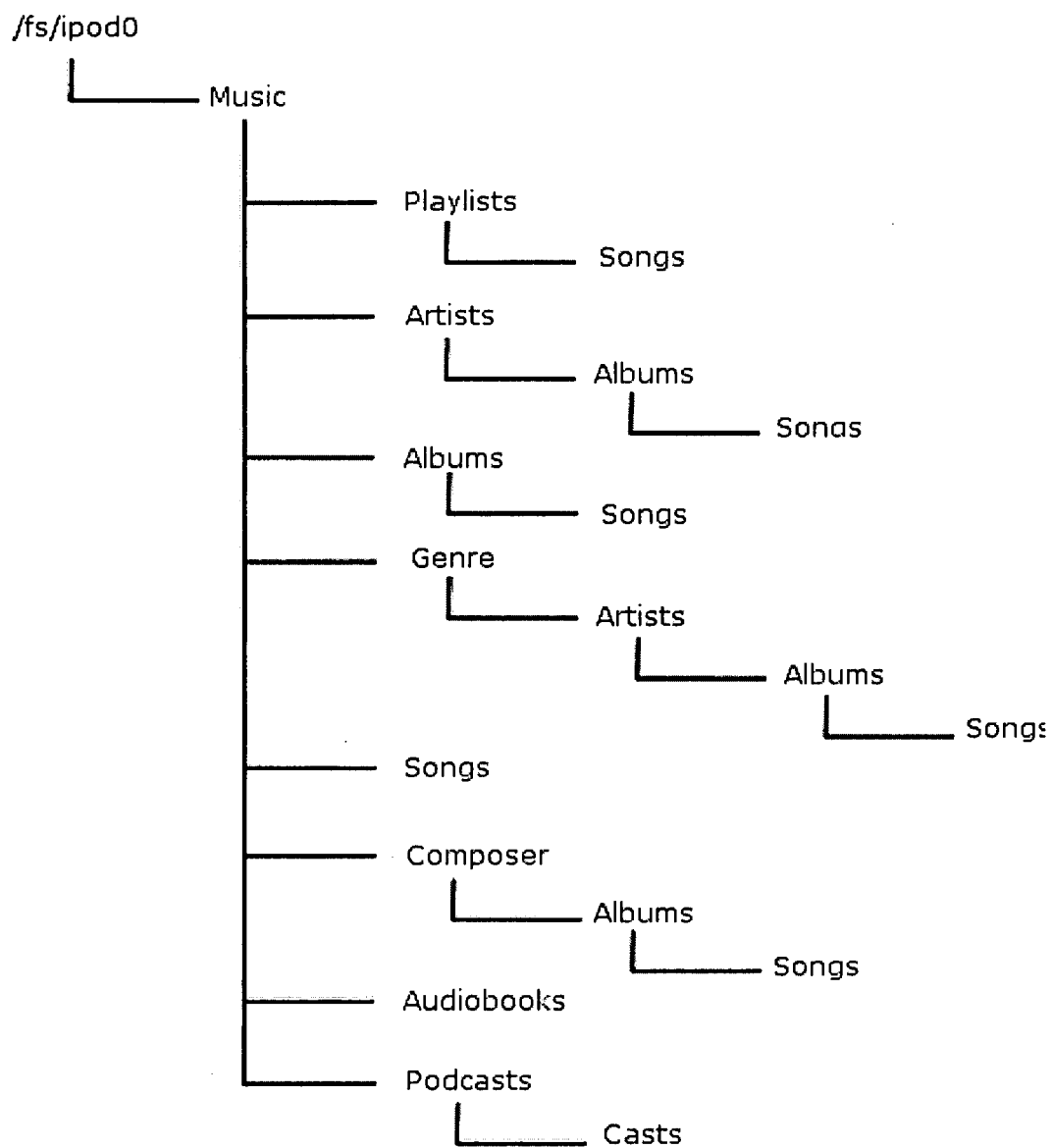
FIG. 4 illustrates an exemplary directory structure for a first occurrence of an iPod(R) in the system of FIG. 1.

The iPod® module 265 may create a directory structure from a connected iPod(R) by querying the internal database of the device. Each item on an iPod® module's 265 menu is a database query. For example, selecting Albums queries the database for albums. Each item on an iPod's menu is a subquery of the query represented by the parent menu item. Using this organizing principle, the ipod module 265 generates a filesystem directory structure that resembles an iPod® menu structure. This means that commandline operations can be performed on the iPod. For example, performing the POSIX command "cd Music; ls" may have the same effect as a user selecting the Music option on the iPod®. Both yield the same listing of items. An exemplary directory structure for a first occurrence of an iPod® is shown in FIG. 4 and includes the folder "music," where the folder "music" includes the subfolders "playlist," "artist," "albums," "genre," "songs," "composer," "audiobooks" and "podcasts." In this example, each subfolder terminates in a further subfolder containing "songs".

iPod® devices do not export their digital content. Consequently, music files on an iPod® connected to the MME 105 may be played by the iPod® itself, while the MME 105 may be responsible for sending control commands to the device to initiate playback, stop, pause, etc. The analog audio output from the iPod(R) can be routed to an amplifier directly.

On some devices like the iPod(R), there may be duplicate song names or songs that use characters that are not compatible with the common filesystem representation used by the media filesystem 220 to interact with higher-level applications. In POSIX, for example, the character "/" is reserved, so it cannot be used. Incompatible characters can be converted to a character string of a "%" followed by two hex digits corresponding to the specific character. For example, "/" could be converted to "%2F," and the character "%" could be converted to "%25." Any file starting with "." would also change, for example, ".file" may become "%2Efile". Duplicate song names may be represented using a "~" character and an instance number added to the filename. These operations allow the media filesystem 220 to return unique names in a POSIX type filesystem that can be matched in the future. A display program implemented in the HMI 110 may be used to display the original names by removing any "~" followed by numbers from the end of a file and converting any %xx to the original character before displaying the name to the user.

The tmpfs module 210 may be used to provide a filesystem interface to shared memory. It may allow RAM to be used as a storage medium with a full POSIX filesystem running on top of it. By simply pointing database 130 at the filesystem mount path of tmpfs 210, the database 130 may be accessed in RAM only, avoiding the performance costs of running on slower devices like flash. Similarly, the devf-generic module 175 provides a POSIX based filesystem for flash-like media devices.

Device control codes may be defined for controlling physical devices 120 accessed via the media filesystem 220. The control codes may be divided into those that direct the device driver to perform some action, and those that obtain information or metadata from the device. If a code is not supported by the device access layer, then either it is ignored and the call returns successfully with null data, or an error code may be returned (ENOTTY—Inappropriate I/O control operation).

The device control function codes are applied to opened files. In the following descriptions, a data transfer buffer is not used unless specified. If a data buffer is used to receive data, the number of bytes written to the buffer exceeds the specified buffer size, and the number of bytes written to the buffer is returned as the informative value (in a dev_info_ptr argument). If the return data is a UTF string, then it may be null-terminated, even if the string had to be truncated because the receive buffer was not large enough. For example, in the following code the assert( ) should be true even if the song title is larger than the buffer:

```
char buffer[16];
int fd, len;
status = devctl(fd, DCMD_MEDIA_SONG, buffer, sizeof(buffer),&len);
if (status == 0)
assert((strlen(buffer) + 1) == len);
```

Several exemplary device control codes are described below.

DCMD_MEDIA_PLAY—This control code may be used to direct the device to play the current file (a song, recording or video). The devctl( ) call returns:

ENOTTY if playback is not supported by the device

EINVAL if the file can't be played for some reason

DCMD_MEDIA_PAUSE—This control code may be used to direct the device to pause the play of the current file. The devctl( ) call returns EINVAL if a file is not currently playing.

DCMD_MEDIA_RESUME—This control code may be used to direct the device to resume the play of the current file. The devctl( ) call returns EINVAL if the file is not currently paused.

DCMD_MEDIA_NEXT_TRACK—This control code may be used to direct the device to skip to the next file (track, song, or recording) in the device's playlist or album. The devctl( ) call returns EINVAL if the object is not currently playing or paused.

DCMD_MEDIA_PREV_TRACK—This control code may be used to direct the device to skip to the previous file in the device's playlist or album. The devctl( ) call returns EINVAL if the object is not currently playing or paused.

DCMD_MEDIA_FASTFWD—This control code may be used to transfer an integer value to the device access layer via the data buffer (the buffer size should be sizeof (int), which may be, for example, 4 bytes). The integer value indicates the rate, as a multiple of the normal playback rate, at which the device should fast forward. A value of 2 specifies moving forward at double the normal playback speed.

DCMD_MEDIA_FASTRWD—This control code may be used to transfer a 32 bit integer value to the device access layer via the data buffer (the buffer size may be, for example, 4 bytes). The value indicates the rate at which the device should rewind, as be a multiple of the normal playback rate. A value of 2 specifies moving backward at double the normal playback speed.

DCMD_MEDIA_PLAYBACK_INFO—This control code may be used to obtain information about the currently playing song. The devctl( ) call returns EINVAL if the file identified by the file descriptor is not currently playing or paused. The data written to the specified buffer may be a media_playback_t structure with at least the following members:

uint32_t count; The total number of tracks in the playback list uint32_tindex; The track index currently in playback Uint8_tstate; The device's playback state selected from the following:

PLAYBACK_STATE_STOP

PLAYBACK_STATE_PLAY

PLAYBACK_STATE_PAUSE uint32_tlength; The length of the track (in, for example, seconds)
uint32_telapsed; The elapsed time for the current track
uint32_tmetaflags; Bit mask
DCMD_MEDIA_GET_SHUFFLE—This code gets the shuffle setting for the device. The data buffer contains a single byte, which can be one of:
SHUFFLE_OFF
SHUFFLE_TRACKS
SHUFFLE_ALBUMS
DCMD_MEDIA_SET_SHUFFLE—This control code may be used to set the shuffle setting for the device. The first byte of the data buffer may be interpreted as the shuffle setting.
DCMD_MEDIA_GET_REPEAT—This control code may be used to obtain the repeat setting for the device. The data buffer may contain a single byte, which can be one of the following:
REPEAT_OFF
REPEAT_ONE_TRACK
REPEAT_ALL_TRACKS
DCMD_MEDIA_SET_REPEAT—This control code may be used to set the repeat setting for the device. The first byte of the data buffer is the shuffle setting and may use the states listed under the DCMD_MEDIA_GET_REPEAT command.
DCMD_MEDIA_SONG—This control code may be used to obtain the name or title of the track identified by the file descriptor parameter. A devctl( ) module may copy a UTF-8 character string of n_bytes bytes, to the data buffer.
DCMD_MEDIA_ALBUM—This control code may be used to obtain the album name associated with the track identified by the file descriptor parameter. a devctl( ) module may copy a UTF-8 character string of n_bytes bytes to the data buffer.
DCMD_MEDIA_ARTIST—This control code may be used to obtain the name of the artist who performed the track identified by the file descriptor parameter. A devctl( ) module may copy a UTF-8 character string of n_bytes bytes to the data buffer.
DCMD_MEDIA_GENRE—This control code may be used to obtain the name of the genre to which the track belongs. The devctl( ) module may copy a UTF-8 character string of n_bytes bytes to the data buffer.
DCMD_MEDIA_COMPOSER—This control code may be used to obtain the name of the composer of the track identified by the file descriptor parameter. The devctl( ) may copy a UTF-8 character string of n_bytes bytes to the data buffer.
DCMD_MEDIA_RELEASE_DATE—This control code may be used to obtain the release date of the track identified by the file descriptor parameter. The data buffer may have a 48-byte data structure written to it. This structure may include fields for the year, month (1-12) and day (1-31) of the release of the song. There also may be a text field that is filled in with a UTF-8 string representing the date in a device-dependent date format. The structure may have the following format:

```
struct _media_date {
uint16_t    year;
uint8_t     seconds;   // (0-59)
uint8_t     minutes;   // (0-59)
uint8_t     hours;     // (0-23)
uint8_t     day;       // (1-31)
uint8_t     month;     // (1-12)
uint8_t     weekday;   // (0-6, where 0=Sunday, 1=Monday ... 6=Saturday)
char        text[40];  // ASCII date as formatted by device
};
```

DCMD_MEDIA_TRACK_NUM—This control code may be used to obtain the original track number for the song. The track number may be returned as an integer value in the data buffer.
DCMD_MEDIA_PUBLISHER—This control code may be used to obtain the name of the publisher of the track. The devctl( ) may copy a UTF-8 character string of n_bytes bytes to the data buffer.
DCMD_MEDIA_DEVINFO—This control code may be used to obtain device information in a UTF-8 character string format. The content of this string may be device-dependent. The following is an example device information string from an MTP device:

| | |
|---|---|
| Standard Version = | 100 |
| Vendor ext id = | 0x6 |
| Vendor ext ver = | 100 |
| Vendor ext desc = | microsoft.com/WMDRMPD: 10.1; microsoft.com:1.0; |
| Ops supported = | 0x1014, 0x1015, 0x1001, 0x1002, 0x1003, 0x1004, 0x1005, 0x1007, 0x1008, 0x1009, 0x101B, 0x100C, 0x100D, 0x100B, 0x1012, 0x1016, 0x9801, 0x9802, 0x9803, 0x9805, 0x9806, 0x9810, 0x9811, 0x9201, 0x9101, 0x9102, 0x9103, 0x9104, 0x9105, 0x9106, 0x9107, 0x9108, 0x9109, 0x910A, 0x910B, 0x9170, 0x9171, 0x9172, 0x9173, 0x9180, 0x9181, 0x9182, 0x9183, 0x9184, 0x9185, 0x9800, |
| Events supported = | |
| Props supported = | 0x5001, 0xD101, 0xD102, 0xD103, 0xD401, 0xD402, |
| Capture fmts supp = | |
| Img formats supp = | 0x3001, 0x3009, 0x3008, 0x3801, 0xBA05, 0xBA03, 0xB901, |
| Manufacturer = | IRIVER |
| Model = | IRIVER Device |
| Device Version = | PP5020AF-02.51-ENG-MT-DT, (Build 157.13) |
| Serial Number = | 3ME5G7QX |

Figure 5:
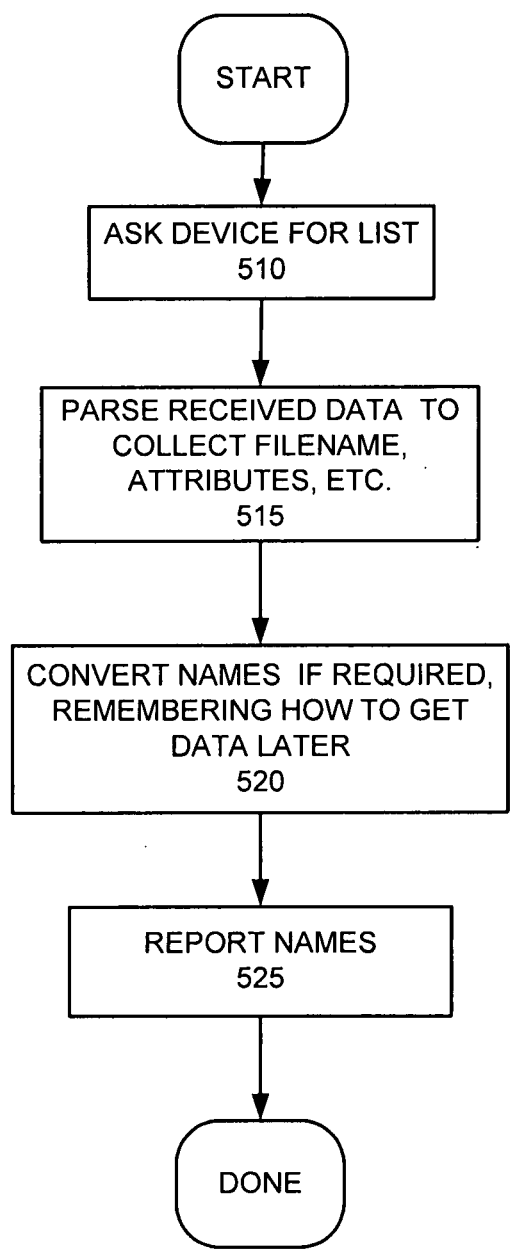
FIG. 5 is a flowchart showing a number of interrelated operations that may be associated with the media filesystem of FIG. 2 pursuant to obtaining a list of files from an arbitrary media device.

FIG. 5 is a flow chart showing a number of interrelated operations that may be associated with the media filesystem 220 pursuant to obtaining a list of files from an arbitrary media device. As shown, a high-level application, such as the HMI module 110, issues a command at block 510 using, for example, a POSIX command, to obtain a list of files/content from a media device. The media filesystem 220 identifies this command and uses the corresponding driver to access the data and/or metadata from the media device. The data and/or metadata from the media device is parsed at block 515 to collect the filenames, date created, date modified, file type, file size and other attributes that might be available and useful. Any data or headers that are not required may simply be disregarded or discarded. The data content is then converted from the format in which it was received from the device to a desired filesystem representation at block 520 and reported to the requesting application at block 525. The filesystem representation provided at block 525 corresponds to an arrangement of the data for presentation to the requesting application in a manner mimicking a similar request made using a common file system or otherwise conventional filesystem, such as POSIX. In the course of doing this, the media filesystem 220 may identify where the file was obtained and the manner in which it may be accessed for later use.

When a list of songs is obtained from a media device, the media filesystem 220 may generate and store an internal 32-bit number that may be used to find the actual file in the future. It may report a unique name to the user for each song on the media device and may be capable of converting that unique name back to the 32-bit number later on. This number can be used to retrieve the song name again, or tell the media device to play the song or get metadata, or even the raw song data if the media device supports it. For example, on PlayForSure devices, every song may have a 32-bit object identification that can be used. On an iPod device, the number of down presses from the top of the menu needed to get to the entry may be used for identification purposes.

The records in database 130 may have a number of different structures depending on the requirements of the system. Some fields that may be used in such database records and their corresponding meaning are shown in the table of FIG. 6. Exemplary fields that may be used in connection with a playlist table in database 130 are shown in FIG. 7.

Database 130 also may include a media stores table. Each mediastore in the mediastores table may be used to describe one physical device containing media that the engine has seen. This could be an iPod® device, hard drive, USB stick, DVD Video disc, etc. Mediastores come and go as they are inserted and removed and this table is updated by the MME 105 accordingly as that happens. All entries in the library table may belong to one mediastore which is where the media is located. Mediastores may be uniquely identified by an identifier that can be used to later attain the msid for the mediastore which links to the other tables. FIG. 8 shows exemplary fields that may be used in connection with the media stores table.

Still further, the database 130 may include a slots table. Slots may be used to define filesytem locations where mediastores can be connected and removed. For example, an audiocd may be found in the filesystem at location /fs/cd0. If it were a networked audiocd, it may be found at /net/remote_host/fs/cd0. The MME 205 may be designed to support an unlimited number of slots. FIG. 9 shows exemplary fields that may be used in connection with the slots table.

The metadata corresponding to a file may be available on the media containing the file. However, it is also possible for an external source to add metadata to a file. Metadata for a file may include information regarding the music type and the group that produced the music. It is also possible to incorporate various additional types of metadata. For example, the metadata may include information on the quality of the content stored in the file. This quality information may be used in the selection of contents to be played for a user, or with certain license or other restrictions associated with the content.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A multimedia system comprising:
at least two multimedia devices, where a first one of the at least two multimedia devices has a filesystem, where a second one of the at least two multimedia devices has no filesystem, and where each of the multimedia devices is accessed via a corresponding one of a plurality of multimedia device drivers; and
a memory, the memory comprising:
the multimedia device drivers;
one or more applications adapted to issue filesystem commands and/or receive filesystem responses using a common filesystem representation with respect to files of the plurality of multimedia devices; and
a media filesystem hierarchically disposed between the one or more applications and the multimedia device drivers, the media filesystem adapted to accept the filesystem commands from the one or more applications and provide the filesystem responses to the one or more applications using the common filesystem representation, where the media filesystem is further adapted to communicate with the at least two multimedia devices via the multimedia device drivers, and where each of the multimedia device drivers provides a filesystem view of a corresponding one of the multimedia devices to the media filesystem, and where one of the multimedia device drivers, which corresponds to the second one of the at least two multimedia devices that has no filesystem, provides the filesystem view of the second one of the at least two multimedia devices to the media filesystem.

2. The multimedia system of claim 1, where the common filesystem representation comprises POSIX commands and responses.

3. The multimedia system of claim 1, where the common filesystem representation comprises UNIX commands and responses.

4. The multimedia system of claim 1, where at least one of the one or more applications comprises a human machine interface module.

5. The multimedia system of claim 1, where at least one of the one or more applications comprises a multimedia engine module.

6. The multimedia system of claim 1, where the media filesystem is further adapted to facilitate multimedia device discovery and synchronization.

7. The multimedia system of claim 1, where the media filesystem is further adapted to handle filesystem semantics.

8. The multimedia system of claim 7, where the filesystem semantics comprise semantics selected from the group consisting of pathname resolution, file access, directory access, symbolic linking, file access permissions, and block caching.

9. The multimedia system of claim 1, where the media filesystem mounts the at least two multimedia devices at a named directory corresponding to the device.

10. The multimedia system of claim 9, where the media filesystem designates the named directory for each device as /fs/dev_id, where dev_id indicates a type of device with a suffix representing an instance of the device.

11. The multimedia system of claim 1, where the media filesystem uses menu item selections of the second one of the at least two multimedia devices to generate a filesystem structure for the second one of the at least two multimedia devices.

12. The multimedia system of claim 1, where the multimedia system further comprises a database arranged to organize file content information associated with the at least two multimedia devices.

13. The multimedia system of claim 1, where the multimedia system further comprises a database arranged to organize playlist tables associated with the at least two multimedia devices.

14. The multimedia system of claim 1, where the multimedia system further comprises a database arranged to organize mediastores of the multimedia system.

15. The multimedia system of claim 1, where the multimedia system further comprises a database arranged to organize slots for the at least two multimedia devices.

16. The multimedia system of claim 15, where the second one of the at least two multimedia devices, which does not include a filesystem, is accessed via TCP/IP by the one of the at least two multimedia device drivers that provides the filesystem view of the second one of the at least two multimedia devices.

17. A multimedia system comprising:
at least two multimedia devices having differing filesystems and/or no filesystem(s); and
a memory, the memory comprising:
one or more applications adapted to issue filesystem commands and receive filesystem responses with respect to files of the at least two multimedia devices, where the filesystem commands and the filesystem responses are sent to and received by the one or more applications using a common filesystem representation;
a unified filesystem module adapted to accept the filesystem commands from the one or more applications and to provide the files system responses to the one or more applications using the common filesystem representation; and
at least two multimedia device drivers, where the unified filesystem module is logically between the at least two multimedia device drivers and the one or more applications, where each of the at least two multimedia device drivers provides a filesystem view of a corresponding one of the at least two multimedia devices to the unified filesystem module, where a first one of the at least two multimedia devices has a filesystem, where a second one of the at least two multimedia devices does not include a filesystem, and where one of the at least two multimedia device drivers that corresponds to the second one of the at least two multimedia devices provides the filesystem view of the second one of the at least two multimedia devices to the unified filesystem module.

18. The multimedia system of claim 17, where the common filesystem representation comprises POSIX commands and responses.

19. The multimedia system of claim 17, where the common filesystem representation comprises UNIX commands and responses.

20. The multimedia system of claim 17, where at least one of the one or more applications comprises a human machine interface module.

21. The multimedia system of claim 17, where at least one of the one or more applications comprises a multimedia engine module.

22. The multimedia system of claim 17, where the unified filesystem module is further adapted to handle filesystem semantics.

23. The multimedia system of claim 22, where the filesystem semantics comprise semantics selected from the group consisting of pathname resolution, file access, directory access, symbolic linking, file access permissions, and block caching.

24. The multimedia system of claim 17, where the unified filesystem module mounts the at least two multimedia devices at a named directory corresponding to the device.

25. The multimedia system of claim 24, where the unified filesystem module designates the named directory for each device as /fs/dev_id, where dev_id indicates a type of device with a suffix representing an instance number of the device.

26. The multimedia system of claim 17, where the unified filesystem module uses menu item selections of the second one of the at least two multimedia devices to generate a filesystem structure for the second one of the at least two multimedia devices.

27. The multimedia system of claim 17, where the multimedia system further comprises a database arranged to organize file content information associated with the at least two multimedia devices.

28. The multimedia system of claim 17, where the multimedia system further comprises a database arranged to organize playlist tables associated with the at least two multimedia devices.

29. The multimedia system of claim 17, where the multimedia system further comprises a database arranged to organize mediastores of the multimedia system.

30. The multimedia system of claim 17, where the multimedia system further comprises a database arranged to organize slots for the at least two multimedia devices.

31. A non-transitory computer readable media comprising instructions executable with a processor, the instructions comprising:
at least two device drivers adapted to communicate with at least two multimedia devices;
at least two multimedia applications hierarchically disposed above the device drivers; and
a filesystem abstraction layer disposed between the at least two device drivers and the at least two multimedia applications, where the filesystem abstraction layer provides a common filesystem interface to the at least two multimedia applications, and where each of the at least two device drivers provides a filesystem view of a corresponding one of the at least two multimedia devices to the filesystem abstraction layer, where a first one of the at least two multimedia devices has a filesystem, where a second one of the at least two multimedia devices has no filesystem, and where the multimedia device driver corresponding to the second one of the at least two multimedia devices provides the filesystem view of the second one of the at least two multimedia devices to the filesystem abstraction layer.

32. The computer readable media of claim 31, where the common filesystem interface comprises UNIX commands and responses.

33. The computer readable media of claim 31, where at least one of the at least two multimedia applications comprises a human machine interface module.

34. The computer readable media of claim 31, where at least one of the at least two of multimedia applications comprises a multimedia engine module.

35. The computer readable media of claim 31, where the filesystem abstraction layer mounts the at least two multimedia devices at a named directory corresponding to the respective device.

36. The computer readable media of claim 35, where the filesystem abstraction layer designates the named directory for each of respective device as /fs/dev_id, where dev_id indicates a device type with a suffix representing an instance number for the respective device.

37. The computer readable media of claim 31, where the filesystem abstraction layer uses menu item selections of the second one of the at least two multimedia devices to generate a filesystem structure for the second one of the at least two multimedia devices.

* * * * *